US007177863B2

(12) United States Patent
Charpiot et al.

(10) Patent No.: US 7,177,863 B2
(45) Date of Patent: Feb. 13, 2007

(54) SYSTEM AND METHOD FOR DETERMINING INTERNAL PARAMETERS OF A DATA CLUSTERING PROGRAM

(75) Inventors: Boris Charpiot, Weil im Schoenbuch (DE); Barbara Hartel, Wendlingen (DE); Christoph Lingenfelder, Herrenberg (DE); Thilo Maier, Heiningen (DE)

(73) Assignee: International Business Machines Corporation, Armonk, NY (US)

( * ) Notice: Subject to any disclaimer, the term of this patent is extended or adjusted under 35 U.S.C. 154(b) by 536 days.

(21) Appl. No.: 10/390,132

(22) Filed: Mar. 14, 2003

(65) Prior Publication Data

US 2003/0204484 A1    Oct. 30, 2003

(30) Foreign Application Priority Data

Apr. 26, 2002    (EP)   .................................. 02009574

(51) Int. Cl.
*G06F 17/30* (2006.01)
*G06F 17/00* (2006.01)

(52) U.S. Cl. ........................ 707/5; 707/3; 707/6; 707/7; 707/10; 707/103 R; 704/221; 704/239; 715/516; 715/529

(58) Field of Classification Search .................. 706/15; 707/1, 6, 101, 102, 3, 5, 7, 10, 103 R; 717/120; 712/241; 715/516, 529; 704/221, 239; 709/201
See application file for complete search history.

(56) References Cited

U.S. PATENT DOCUMENTS

| 5,440,742 A | * | 8/1995 | Schwanke ................... 717/120 |
| 5,625,810 A | * | 4/1997 | Kurosu et al. ................. 707/1 |
| 5,642,502 A | * | 6/1997 | Driscoll ........................ 707/5 |
| 5,761,496 A | * | 6/1998 | Hattori ......................... 707/5 |
| 5,911,139 A | * | 6/1999 | Jain et al. ...................... 707/3 |
| 5,911,143 A | * | 6/1999 | Deinhart et al. ........ 707/103 R |
| 6,049,797 A | * | 4/2000 | Guha et al. .................... 707/6 |
| 6,100,901 A |   | 8/2000 | Mohda et al. ................. 707/2 |

(Continued)

FOREIGN PATENT DOCUMENTS

JP    2001-117937    *    4/2001

OTHER PUBLICATIONS

Cohn, D. et al., "Semi-Supervised Clustering With User Feedback," AAAI 2000.

*Primary Examiner*—Shahid Al Alam
(74) *Attorney, Agent, or Firm*—Samuel A. Kassatly

(57) ABSTRACT

A system and associated method for tuning a data clustering program to a clustering task, determine at least one internal parameter of a data clustering program. The determination of one or more of the internal parameters of the data clustering program occurs before the clustering begins. Consequently, clustering does not need to be performed iteratively, thus improving clustering program performance in terms of the required processing time and processing resources. The system provides pairs of data records; the user indicates whether or not these data records should belong to the same cluster. The similarity values of the records of the selected pairs are calculated based on the default parameters of the clustering program. From the resulting similarity values, an optimal similarity threshold is determined. When the optimization criterion does not yield a single optimal similarity threshold range, equivalent candidate ranges are selected. To select one of the candidate ranges, pairs of data records having a calculated similarity value within the critical region are offered to the user.

29 Claims, 3 Drawing Sheets

U.S. PATENT DOCUMENTS

| | | | |
|---|---|---|---|
| 6,112,194 A | 8/2000 | Bigus | 706/11 |
| 6,115,708 A | 9/2000 | Fayyad et al. | 706/6 |
| 6,223,281 B1 * | 4/2001 | Bird et al. | 712/241 |
| 6,330,576 B1 * | 12/2001 | Mochizuki et al. | 715/529 |
| 6,618,727 B1 * | 9/2003 | Wheeler et al. | 707/10 |
| 6,728,706 B2 * | 4/2004 | Aggarwal et al. | 707/5 |
| 2002/0059202 A1 * | 5/2002 | Hadzikadic et al. | 707/3 |
| 2002/0099675 A1 * | 7/2002 | Agrafiotis et al. | 706/15 |
| 2002/0152208 A1 * | 10/2002 | Bloedorn | 707/6 |
| 2004/0107205 A1 * | 6/2004 | Burdick et al. | 707/102 |
| 2004/0181526 A1 * | 9/2004 | Burdick et al. | 707/6 |
| 2004/0181527 A1 * | 9/2004 | Burdick et al. | 707/6 |

* cited by examiner

| RECORDS | $D_{j=1}$ | $D_{j=2}$ | ... | $D_{j=N}$ |
|---|---|---|---|---|
| ... | | | | |
| | | | | |
| $R_i$ | $D_{i1}$ | $D_{i2}$ | ... | $D_{iN}$ |
| ... | | | | |
| | | | | |
| $R_k$ | $D_{k1}$ | $D_{k2}$ | ... | $D_{kN}$ |
| ... | | | | |

SYSTEM AND METHOD FOR DETERMINING INTERNAL PARAMETERS OF A DATA CLUSTERING PROGRAM

PRIORITY CLAIM

The present application claims the priority of European patent application, Serial No. 02009574.1, titled "A Method for Determining Internal Parameters of a Data Clustering Program," which was filed on Apr. 26, 2002, and which is incorporated herein by reference.

FIELD OF THE INVENTION

The present invention relates to the field of data clustering, and in particular the determination of input parameters for a clustering algorithm.

BACKGROUND OF THE INVENTION

Clustering of data is a data processing task in which clusters are identified in a structured set of raw data. Typically, the raw data comprises a large set of records with each record having the same or a similar format. Each field in a record can take any of a number of categorical or numerical values. Data clustering aims to group these records into clusters such that records belonging to the same cluster have a high degree of similarity.

A variety of algorithms are known for data clustering. The K-means algorithm relies on the minimal sum of Euclidean distances to centers of clusters taking into consideration the number of clusters. The Kohonen-algorithm is based on a neural net and also uses Euclidean distances. IBM's demographic algorithm relies on the sum of internal similarities minus the sum of external similarities as a clustering criterion. Those and other clustering criteria are utilized in an iterative process of finding clusters.

One field of application of data clustering is data mining. U.S. Pat. No. 6,112,194 describes a method for data mining including a feedback mechanism for monitoring performance of mining tasks is known. A user selected mining technique type is received for the data mining operation. A quality measure type is identified for the user selected mining technique type. The user selected mining technique type for the data mining operation is processed and a quality indicator is measured using the quality measure type. The measured quality indication is displayed while processing the user selected mining technique type for the data mining operations.

U.S. Pat. No. 6,115,708 describes a method for refining the initial conditions for clustering with applications to small and large database clustering is known. It is disclosed how this method is applied to the popular K-means clustering algorithm and how refined initial starting points indeed lead to improved solutions. The technique can be used as an initializer for other clustering solutions. The method is based on an efficient technique for estimating the modes of a distribution and runs in time guaranteed to be less than overall clustering time for large data sets. The method is also scalable and hence can be efficiently used on huge databases to refine starting points for scalable clustering algorithms in data mining applications.

U.S. Pat. No. 6,100,901 describes a method for visualizing a multi-dimensional data set is known in which the multi-dimensional data set is clustered into k clusters, with each cluster having a centroid. Either two distinct current centroids or three distinct non-collinear current centroids are selected. A current 2-dimensional cluster projection is generated based on the selected current centroids. In the case when two distinct current centroids are selected, two distinct target centroids are selected, with at least one of the two target centroids being different from the two current centroids.

U.S. Pat. No. 5,857,179 describes a computer method for clustering documents and automatic generation of cluster keywords is known. An initial document by term matrix is formed, each document being represented by a respective M-dimensional vector, where M represents the number of terms or words in a predetermined domain of documents. The dimensionality of the initial matrix is reduced to form resultant vectors of the documents. The resultant vectors are then clustered such that correlated documents are grouped into respective clusters. For each cluster, the terms having greatest impact on the documents in that cluster are identified. The identified terms represent key words of each document in that cluster. Further, the identified terms form a cluster summary indicative of the documents in that cluster.

Further, a variety of supervised learning techniques is known from the prior art of neural networks. Supervised learning requires input and resulting output pairs to be presented to the network during the training process. Back propagation, for example, uses supervised learning and makes adjustments during training so that the value computed by the neural network will approach the actual value as the network learns from the data presented. Supervised learning is used in the techniques provided for predicting classification, as well as for predicting numerical values.

Cohn, D. et al., "Semi-Supervised Clustering With User Feedback," AAAI 2000, describes a clustering approach is known where the user can iteratively provide feedback to the clustering algorithm after each clustering step. The disadvantage of this clustering approach is that the clustering needs to be performed iteratively which requires a disproportional amount of processing power and time. Another disadvantage is that the user must select suitable pairs of data records from a typically very large set of records.

What is therefore needed is a system and associated method for determining input parameters for a clustering algorithm that will minimize the number of processing iterations and processing time while maximizing processing resources. The need for such a system has heretofore remained unsatisfied.

SUMMARY OF THE INVENTION

The present invention satisfies this need, and presents a system, a computer program product, and an associated method (collectively referred to herein as "the system" or "the present system") for determining at least one internal parameter of a data clustering program to "tune" the data clustering program to the clustering task. The present system is particularly advantageous in that it allows a determination of one or more of the internal parameters of the data clustering program before the clustering begins. In addition, the clustering does not need to be performed iteratively. Consequently, the performance in terms of the required processing time and processing resources of the clustering program does not deteriorate.

In accordance with a preferred embodiment of the system a user selects or the system provides pairs of data records. The user then indicates whether a selected record pair contains similar or dissimilar records. In other words, the user indicates for a selected pair of data records whether these data records should belong to the same cluster or not, providing a priori knowledge to the clustering program. This a priori knowledge allows the clustering program to "tune" the internal parameters accordingly.

In accordance with a further preferred embodiment of the present system, the similarity threshold parameter is determined by means of the user inputs. The similarity values of the records of the selected pairs are calculated based on the default parameters of the clustering program. From the resulting similarity values, an optimal similarity threshold is determined.

In accordance with a further preferred embodiment of the present system, the field weights of the external function of the similarity value function are "tuned" to obtain an optimal similarity threshold. This "tuning is achieved by determining at least one of the weighting factors that when modified results in an overall improvement with respect to the similarity values vis-à-vis the optimal similarity threshold.

In accordance with a further preferred embodiment of the present system, at least two candidate ranges are determined for the optimal similarity threshold. This situation occurs when the optimization criterion does not yield a single optimal similarity threshold range but equivalent candidate ranges. These candidate ranges are equal with respect to the optimization criterion as evaluated against the user selected pairs.

To select one of the candidate ranges, pairs of data records having a calculated similarity value within the critical region, i.e. between the ranges, are offered to the user. The user is asked to indicate whether these additional pairs comprise similar or dissimilar records. Based on these additional data the optimization criterion is reevaluated.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figures 1, 3:
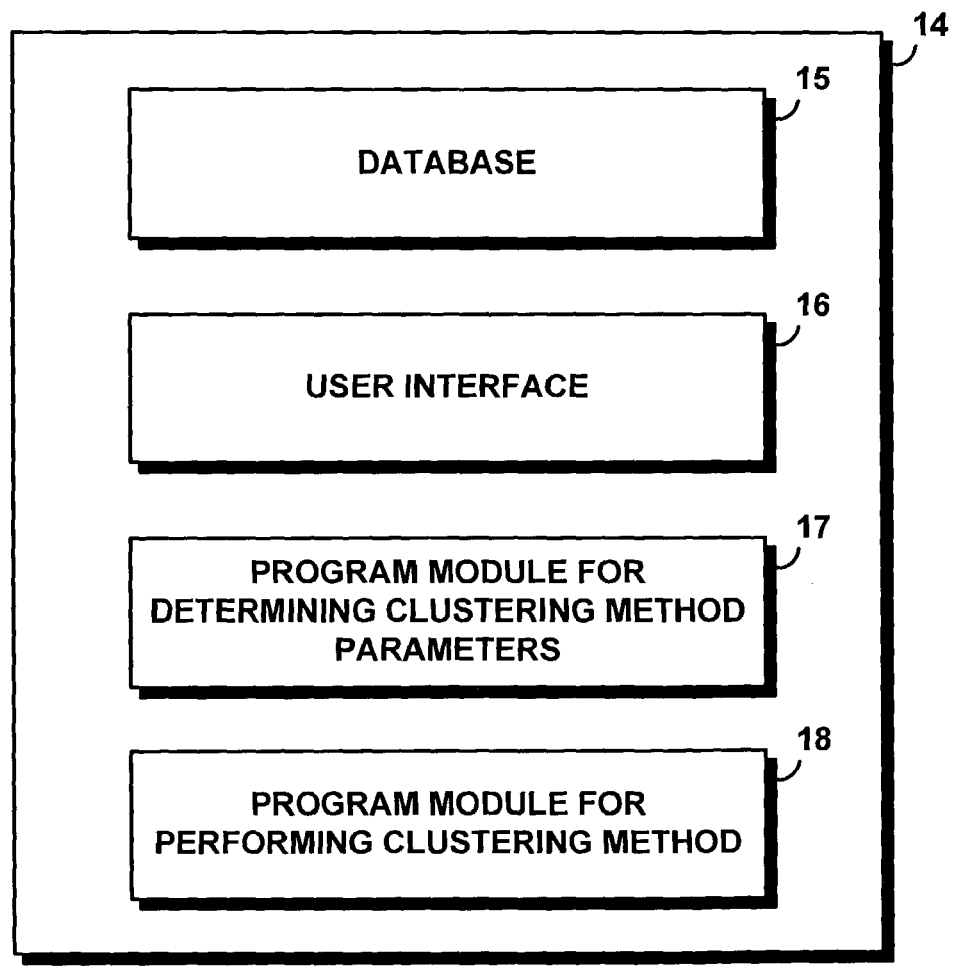
FIG. 1 is an exemplary diagram illustrating data records to be clustered.
FIG. 3 is a block diagram representing a high-level architecture of the internal parameter determining system of FIG. 2.

FIG. 1 illustrates the structure of the data records to be clustered. Each of the records R has a number of N data fields D. By way of example, the records $R_i$ and $R_k$ are shown in FIG. 1. Each of the records has data fields $D_j$, where j=1 to N with values $D_{ij}$ and $D_{kj}$, respectively.

Figure 2:
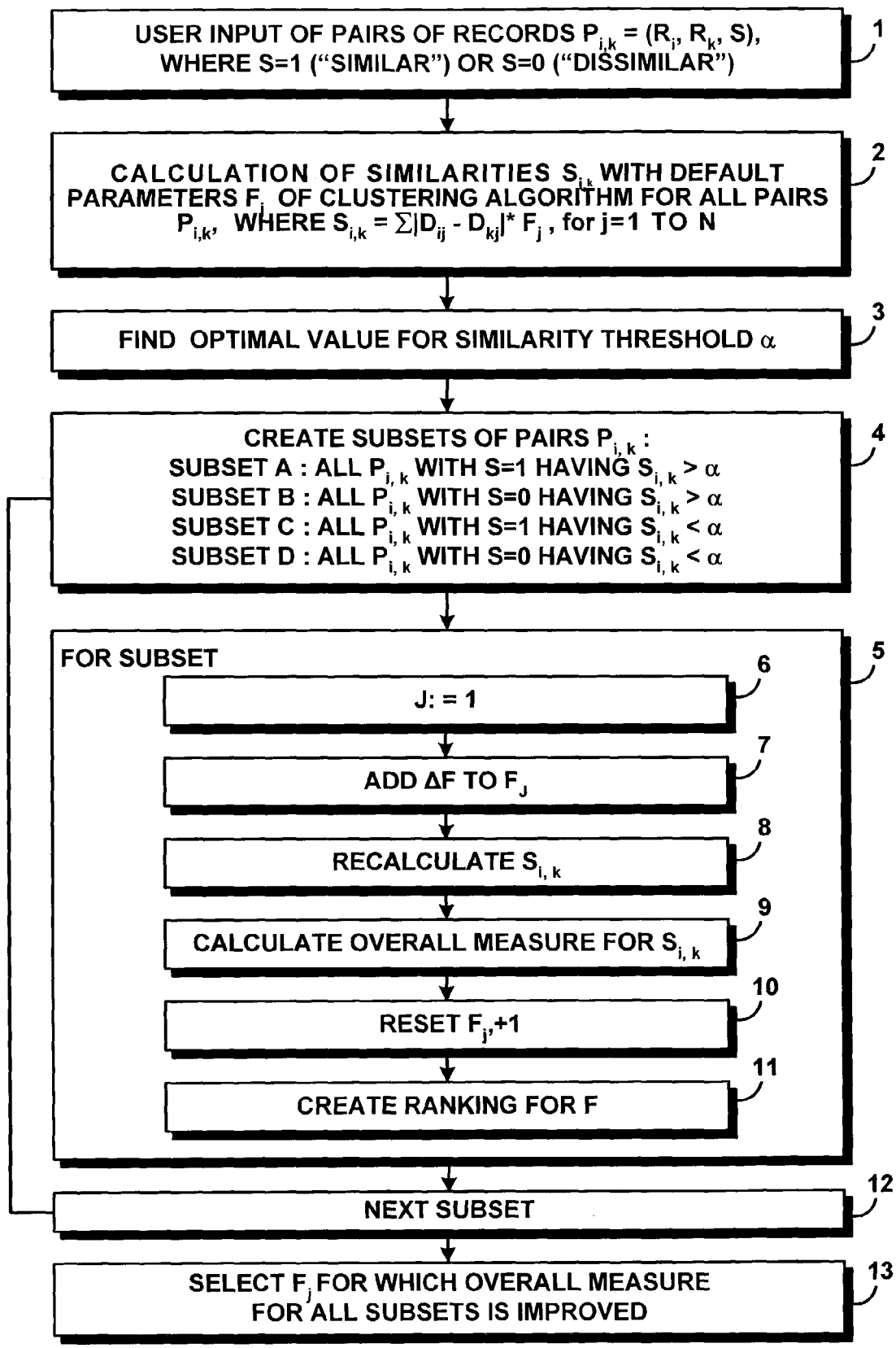
FIG. 2 is a process flow chart illustrating a method of operation of an embodiment of the internal parameter determining system for a data clustering program of the present invention.

FIG. 2 is a process flowchart illustrating a method to "tune" internal parameters of a clustering method performing a data clustering operation on the records R of FIG. 1.

In step 1, a user provides information to the data processing system regarding the similarity or dissimilarity of certain pairs of records. Typically a data clustering operation is performed on a large number of records, which can be on the order of thousands or millions of records. From this large number of records a very limited number of record pairs is chosen. The pairs of data records can be chosen by the present system or by the user.

For a selected pair of records, the user needs to indicate whether these records are similar or dissimilar; in other words, whether the records of the selected pair of records should belong to the same cluster or not. A number of pairs of records $P_{i,k}=(R_i, R_k, s)$ are reviewed by the user, where s=1 indicates a similarity of the records $R_i$ and $R_k$ whereas s=0 indicates dissimilar records $R_i$ and $R_k$.

The similarities $S_{i,k}$ of each of the pairs of records $P_{i,k}$ are calculated as follows in step 2:

$$S_{i,k} = \sum_{j=1\_to\_N} |D_{ij} - D_{kj}| * F_j$$

where $D_{ij}$ is the data value which is entered in the data field $D_j$ of the record $R_i$ and where $D_{kj}$ is the data value which is entered in the data field $D_j$ of the record $R_k$ and where $F_j$ is the weighting parameter which is assigned to the data field $D_j$. The similarities $S_{i,k}$ are calculated by summing the weighted absolute differences of the data values of the data fields of the records $R_i$ and $R_k$ of the pair of records $P_{i,k}$.

In the more general case, the similarities $S_{i,k}$ are calculated by means of an internal function and an external function. The internal function is the absolute difference of the data values $D_{ij}$ and $D_{kj}$.

The external function combines the results of the internal function. The external function is the calculation of the weighted sum of the results provided by the internal function.

An alternative method for calculating the similarity $S_{i,k}$ is based on the calculation of the Euclidean distance or a weighted Euclidean distance. The distance must be transformed into an equivalent similarity value.

In step 3, an optimal value for the similarity threshold α is determined. The similarity threshold is an internal parameter, which is used in a demographic clustering algorithm that can be implemented, for example, in IBM's DB2 Intelligent Miner for Data.

An optimal value for the similarity threshold α requires that the highest number of pairs of records $P_{i,k}$ with s=1 have a similarity $S_{i,k}$ above the similarity threshold α and a maximum number of pairs of records $P_{i,k}$ with s=0 have similarities $S_{i,k}$ below the similarity threshold α.

This optimization problem can be solved by initializing the value of α equal to 0 then stepwise incrementing the value of α. For each value of α the respective numbers of dissimilar and similar pairs of records $P_{i,k}$ are determined. Other optimization methods, such as Monte Carlo based approaches can be utilized.

Consequently, a similarity threshold α is determined based on the user inputs provided in step 1. In this manner, a priori user knowledge is provided to the clustering algorithm.

The present system further fine tunes the clustering algorithm with the following steps. In step 4, four subsets A, B, C and D of pairs $P_{i,k}$ are created. The subset A contains all pairs of records $P_{i,k}$ that are similar and have similarities $S_{i,k}$ above α. In other words, the subset A contains the "similar" pairs that are located at the "right side" of the similarity threshold α on the similarity-axis.

The subset B contains the dissimilar pairs of records that have similarities above α. In other words, the subset B contains pairs of records that are located at the "wrong side" with respect to α on the similarity axis.

Likewise, the subset C contains similar pairs of records that are located on the "wrong side" and the subset D contains dissimilar pairs of records that are located at the "right side".

Step 5 is performed separately for each of the subsets A, B, C and D. Step 5 determines a ranking of the weighting factors F for each of the subsets. For this purpose, the index j is initialized equal to 1 in substep 6 of step 5. In substep 7 the weighting factor $F_j$ is modified. In the example considered here, the modification is performed by adding an incremental value ΔF to $F_j$.

In substep 8, the similarities $S_{i,k}$ are recalculated for all the pairs $P_{i,k}$ which belong to the subset being processed in step 5.

In substep 9, an overall measure is calculated for the recalculated similarities $S_{i,k}$ of substep 8. This can be performed by calculating the average value of the similarities $S_{i,k}$ of substep 8.

In substep 10, the weighting factor $F_j$ is reset to its original value and the index j is incremented. From substep 10 the control returns to substep 7 to repeat the substeps 7 to 10 with respect to the next weighting factor $F_j$.

After all N weighting factors $F_j$ have been processed in this manner, a ranking of the weighting factors is determined in substep 11. This ranking is created based on the overall measure for $S_{i,k}$, which has been determined with respect to all of the weighting factors $F_j$. The highest-ranking weighting factor $F_j$ is the weighting factor for which the overall measure has shown the highest increase with respect to the number of pairs $P_{i,k}$ on the correct side of the similarity threshold α.

For the subset A, the preferred weighting factor $F_j$ results in the largest increase of the overall measure for $S_{i,k}$. This preferred weighting factor $F_j$ is followed by weighting factors having smaller increases of the overall measure. Weighting factors for which the overall measure has dropped as compared to the same evaluation based on the default value of the corresponding weighting factor are ranked last.

In step 12 the next subset B is selected for processing in step 5.

The substeps 6 to 11 of step 5 are performed in the same manner as for subset A except that the ranking criterion of step 11 is inverted as the subset B contains dissimilar pairs of records.

One of the weighting factors is selected in step 13 after a ranking for the weighting factors $F_j$ has been created for all the subsets A, B, C and D. The weighting factor F is selected such that the overall measure improves with respect to all subsets, i.e. the overall measure for the subsets containing similar pairs of records increases and the overall measure for those subsets containing dissimilar pairs of records decreases.

In this manner, the selected weighting factor $F_j$ is "tuned" by adding the incremental value ΔF. This process can be repeated iteratively. For example, the steps 1 to 13 can be performed again based on the modified weighting factor $F_j$ as a starting point until no more pairs $P_{i,k}$ "move" to the correct side of α.

FIG. 3 is block diagram illustrating the high-level architecture of a corresponding data processing system 14. The data processing system 14 has a database 15 for storing records $R_i$. In addition, the data processing system 14 has a user interface 16 which serves to input user data. By means of the user interface 16, the user can indicate whether a selected pair of records $R_i$, $R_k$ is similar or dissimilar (step 1 of FIG. 2).

Further, the data processing system 14 has a program module 17 for determining one or more internal parameters of a clustering method, which is implemented in program module 18. The determination of internal parameters for performing the clustering method by means of program module 18 is performed in program module 17 based on the user data that is inputted via the user interface 16. One way of implementing program module 17 is by way of the method depicted in step 2.

Figure 4:
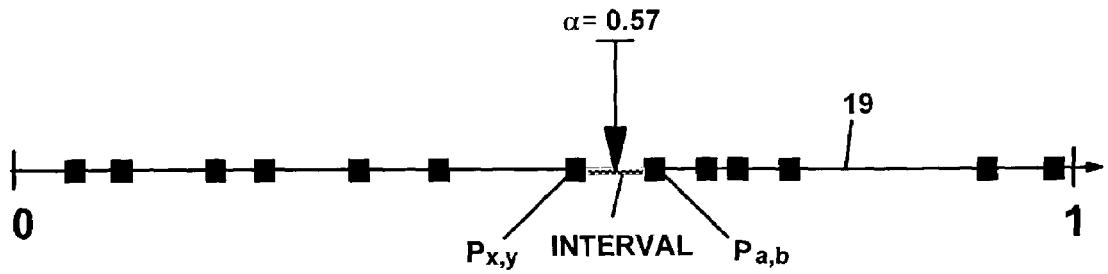
FIG. 4 is a diagram exemplifying the determination of an optimal similarity threshold according to the present invention.

FIG. 4 illustrates an application exemplary data. In this preferred embodiment normalized similarities are used.

In particular, FIG. 4 shows a similarity axis 19 illustrating the similarity of similar pairs of records and the similarity of dissimilar pairs. In this example, an optimal similarity threshold of α=0.57 has been determined.

Other alternative choices for optimal similarity thresholds a are possible in the example considered here between the pairs $P_{x,y}$ and $P_{a,b}$ on the similarity axis 19.

To increase the precision of the similarity threshold α it is possible to select more pairs of records having similarities S within the interval between $P_{x,y}$ and $P_{a,b}$. For such additional pairs of records the user needs to indicate whether they are similar or dissimilar. Based on this additional information the optimization for α is repeated for increased precision.

Figure 5:
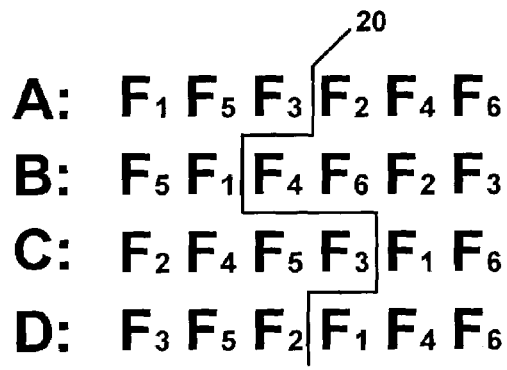
FIG. 5 is a diagram exemplifying the determination of weighting factor according to the present invention.

FIG. 5 is illustrative of the "tuning" of the weighting factors $F_j$ (steps 4 to 13 of FIG. 2).

FIG. 5 shows the ranking for each of the subsets that have been determined in substep 11 of step 5. For the subset A, the ranking is $F_1$, $F_5$, $F_3$, $F_2$, $F_4$ and $F_6$. $F_1$ is the most preferred weighting factor as it has resulted in the largest increase of the overall measure for subset A. Likewise, the ranking for subset B is $F_5$, $F_1$, $F_4$, $F_6$, $F_2$ and $F_3$. $F_5$ is the most preferred weighting factor for this subset as it has resulted in the largest decrease of the overall measure for subset B. The ranking criterion is inverted in this case as subset B contains dissimilar pairs in contrast to subset A. Ranking of weighting factors for subsets C and D is similar.

The line 20 of FIG. 5 indicates where the "cut off" is located for each of the subsets where weighting factors no longer result of improvement but in deterioration. For subset A the cut off is the weighting factor $F_2$, for subset B this is $F_4$, for subset C, $F_1$, and for subset D, also $F_1$.

In this example, a higher field weight for $F_5$ and a lower field weight for $F_6$ improves the overall performance such that more record pairs end up on the "right side" of the threshold.

Figure 6:
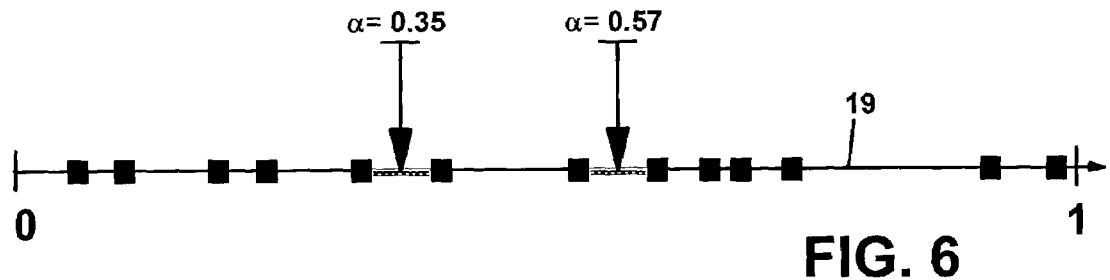
FIG. 6 is a diagram illustrating a situation where there are two candidate ranges for the optimal similarity threshold values.
Figure 7:
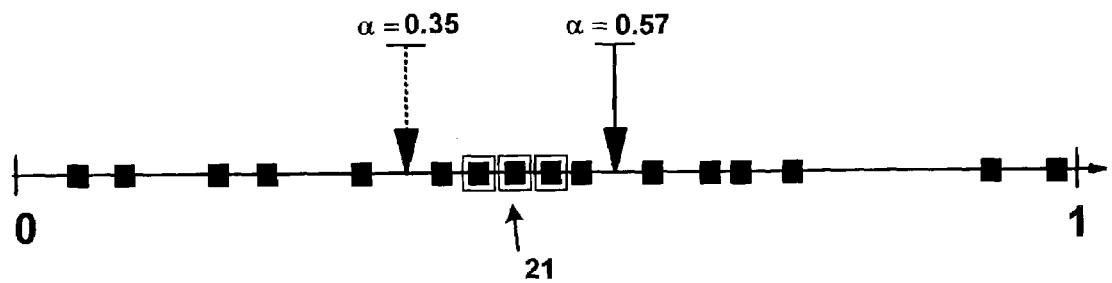
FIG. 7 is a diagram illustrating the selection of one of the candidate values of FIG. 6.

FIGS. 6 and 7 show another application example. In this example there are two equivalent optimal similarity thresholds α that have been identified by means of the optimization method. The first value for α is 0.35 and the second is 0.57. To resolve this ambiguity, additional pairs of records 21 are selected which have similarities between the alternative values for α. Again the user is asked to indicate whether the selected pairs of records contain similar or dissimilar records. Based on this user input, the optimization is repeated to determine which of the alternative values for α is the better one.

A distinctive feature of the present system is that a user does not require an understanding of the clustering algorithm to provide the necessary inputs for the "tuning" of the internal parameters of the clustering method. The present system enables the user to guide the clustering process without any knowledge of the clustering algorithm or the available internal parameters. Further, the invention is not restricted to a specific clustering algorithm but can be employed for a large variety of algorithms.

It is to be understood that the specific embodiments of the invention that have been described are merely illustrative of certain application of the principle of the present invention. Numerous modifications may be made to the method for determining internal parameters of a data clustering program invention described herein without departing from the spirit and scope of the present invention.

What is claimed is:

1. A processor-implemented method for determining an internal parameter of a data clustering program far clustering data records, comprising:
    inputting user data indicative of a similarity for a selected limited number of pairs of data records tram the data records to be clustered;
    calculating similarity values for the selected pairs of data records based on weighting factors of data fields of the selected pairs of data records;
    determining an optimal similarity threshold for the similarity values corresponding to the user data, by requiring that similar pairs of data records have a similarity value above the optimal similarity threshold, and dissimilar pairs of records have a similarity value below the optimal similarity threshold;
    clustering the data records into at least two distinct subsets, wherein the similar pairs of data records and the dissimilar pairs of data records are grouped based on similarity values of the subsets relative to the optimal similarity threshold;
    calculating weighting factors for the subsets; and
    selecting an optimal weighing factor from the calculated weighting factors, wherein the optimal weighting factor increases an overall measure for the subset containing similar pairs of records and decreases an overall measure for the subset containing dissimilar pairs of records.

2. The method of claim 1, further comprising setting the internal parameter as the optimal similarity threshold.

3. The method of claim 2, further comprising storing the optimal similarity threshold.

4. The method of claim 1, wherein determining the optimal similarity threshold comprises determining a first candidate value and a second candidate value.

5. The method of claim 4, further comprising inputting additional user data for pairs of data records having similarity values between the first and second candidate values in order to evaluate the candidate values.

6. The method of claim 1, wherein clustering the data records into at least two distinct subsets comprises determining a first subset of pairs of data records that contains similar data records with a similarity value greater than the optimal similarity threshold.

7. The method of claim 6, wherein clustering the data records into at least two distinct subsets comprises determining a second subset at pairs of data records that contains dissimilar data records with a similarity value greater then the optimal similarity threshold.

8. The method of claim 7, wherein clustering the data records into at least two distinct subsets comprises determining a third subset of pairs of data records that contains similar data records with a similarity value less than the optimal similarity threshold.

9. The method of claim 8, wherein clustering the data records into at least two distinct subset comprises determining a fourth subset of pairs of data records that contains dissimilar data records with a similarity value less than the optimal similarity threshold.

10. The method of claim 9, further comprising, for each of the first, second, third, and fourth subsets, recalculating the similarity values of the pairs of data records.

11. A computer program product having instruction codes stored on a computer useable storage medium, for determining an internal parameter of a data clustering program for clustering data records, comprising:
    a set of instruction codes for inputting user data indicative of a similarity for a selected limited number of pairs of data records from the data records to be clustered:
    a set of instruction codes for calculating similarity values for the selected pairs of data records based on weighting factors of data fields of the selected pairs of data records;
    a set of instruction codes for determining a similarity threshold for the similarity values corresponding to the user data an optimal similarity threshold for the similarity values corresponding to the user data, by requiring That similar pairs of data records have a similarity value above the optimal similarity threshold, and dissimilar pairs of records have a similarity value below the optimal similarity threshold;
    a set of instruction codes for clustering the data records into at least two distinct subsets, wherein the similar pairs of data records and the dissimilar pairs of data records are grouped based on similarity values of the subsets relative to the optimal similarity threshold;
    a set of instruction codes for calculating weighting factors for the subsets; and
    a set of instruction codes for selecting an optimal weighting factor from the calculated weighting factors, wherein the optimal weighting factor increases an overall measure for the subset containing similar pairs of records and decreases an overall measure for the subset containing dissimilar pairs of records.

12. The computer program product of claim 11 further comprising a set of instruction codes for setting the interval parameter as the optimal similarity threshold.

13. The computer program product of claim 12 further comprising a memory for storing the optimal similarity threshold.

14. The computer program product of claim 11, wherein the set of instruction codes for determining the optimal similarity threshold determines a first candidate value and a second candidate value.

15. The computer program product of claim 14, further comprising additional user data for pairs of data records having similarity values between the first and second candidate values.

16. The computer program product of claim 11, wherein the set of instruction codes for clustering the data records into at least two distinct subsets determines a first subset of pairs of data records that contains similar data records with a similarity value greater than the optimal similarity threshold.

17. The computer program product at claim 16, wherein the set of instruction codes for clustering the data records into at least two distinct subset determines a second subset of pairs of data records that contains dissimilar data records with a similarity value greater than the optimal similarity threshold.

18. The computer product of claim 17, wherein the set of instruction codes for clustering the data records into at least two distinct subsets determines a third subset of pairs of data records that contains similar data records with similarity value less than the optimal similarity threshold.

19. The computer program product of claim 18, wherein the set of instruction codes for clustering the data records into at least two distinct subsets determines a fourth subset of pairs of data records that contains dissimilar data records with a similarity value less than the optimal similarity threshold.

20. The computer program product of claim 19, wherein the set of instruction codes recalculates the similarity values of the pairs of data records for each of the first, second, third, and fourth subsets.

21. A processor-implemented system for determining an internal parameter of a data clustering program for clustering data records, comprising:
    means for inputting user data indicative of a similarity for a selected limited number of pairs of data records from the data records to be clustered;
    means for calculating similarity values for the selected pairs of data records based on weighting factors of data fields of the selected pairs of data records;
    means for determining an optimal similarity threshold for the similarity values corresponding to the user data, by requiring that similar pairs of data records have a similarity value above the optimal similarity threshold, and dissimilar pairs of records have a similarity value below the optimal similarity threshold; and a storage storing the optimal similarity threshold
    means for clustering the data records into at least two distinct subsets, wherein the similar pairs of data records and the dissimilar pairs of data records are grouped based on similarity values of the subsets relative to the optimal similarity threshold;
    means for calculating weighting factors for the subsets; and
    means for selecting an optimal weighting factor from the calculated weighting factors, wherein the optimal weighting factor increases an overall measure for the subset containing dissimilar pairs of records.

22. The system of claim 21, further comprising means for setting the internal parameters as the similarity threshold.

23. The system of claim 21, wherein the means for determining the optimal similarity threshold determines a first candidate value and a second candidate value.

24. The system of claim 23, further comprising additional user data for pairs of data records having similarity values between the first and second candidate values.

25. The system of claim 21, wherein the means for clustering the data records into at least two distinct subsets comprises determining a first subset of pairs at data records that contains similar data records with a similarity value greater than the optimal similarity threshold.

26. The system of claim 25, wherein the means for clustering the data records into at least two distinct subsets comprises determining a second subset of pairs of data records that contains dissimilar data records with a similarity value greater than the optimal similarity threshold.

27. The system of claim 26, wherein the means for clustering the data records into at least two distinct subsets comprises determining a third subset of pairs of data records that contains similar data records with a similarity value less than the optimal similarity threshold.

28. The system of claim 27, wherein the means for clustering the data records into at least two distinct subsets comprises determining a fourth subset of pairs of data records that contains dissimilar data records with a similarity value less than the optimal similarity threshold.

29. The system of claim 28, wherein the means for clustering the data records into at least two distinct subsets recalculates the similarity values of the pairs of data records for each of the first, second, third, and fourth subsets.

* * * * *

UNITED STATES PATENT AND TRADEMARK OFFICE
CERTIFICATE OF CORRECTION

| | | |
|---|---|---|
| PATENT NO. | : 7,177,863 B2 | Page 1 of 1 |
| APPLICATION NO. | : 10/390132 | |
| DATED | : February 13, 2007 | |
| INVENTOR(S) | : Charpiot et al. | |

It is certified that error appears in the above-identified patent and that said Letters Patent is hereby corrected as shown below:

On the Title Page Item 56

Please add the following reference of record:

--5,857,179 - 1/5/1999 - Vaithyanathan et al. ...... 702/2--

Column 8:

Claim 11, line 31 "That" should read --that--

Column 10:

Claim 21, line 6, after "subset containing" and before "dissimilar pair of records.", insert --similar pairs of records and decreases an overall measure for the subset containing--

Column 10:

Claim 25, line 18, "at" should read --of--

Signed and Sealed this

Fourteenth Day of October, 2008

JON W. DUDAS
*Director of the United States Patent and Trademark Office*